April 21, 1964   E. L. MAIN ETAL   3,129,717
SYSTEM FOR AUTOMATICALLY ADDING A LIME SLURRY TO WATER
Filed May 23, 1960
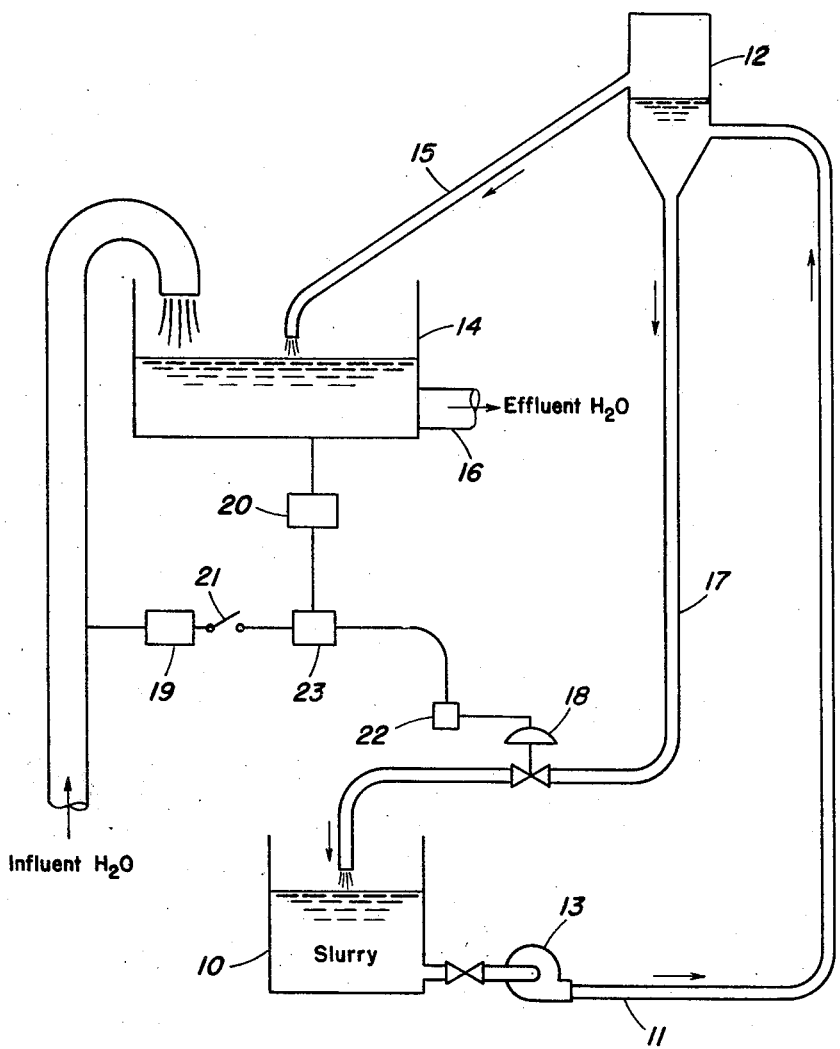
INVENTORS
Earl L. Main
William L. Mann, Jr.
BY *Harold L. Gammon*
AGENT 3,129,717
SYSTEM FOR AUTOMATICALLY ADDING A
LIME SLURRY TO WATER
Earl L. Main, Nixon, and William L. Mann, Jr., Plainfield, N.J., assignors to National Lead Company, New York, N.Y., a corporation of New Jersey
Filed May 23, 1960, Ser. No. 31,054
1 Claim. (Cl. 137—93)

The present invention relates in general to a method and means for continuously controlling the flow rate of a treating agent to a material to be treated wherein the treating agent is a fluid containing a high percentage of solids.

As used herein the term "treating agent" will be understood to include solids-burdened fluids such as slurries and in particular quick settling slurries, that is to say, those containing high percentages of solids; as well as viscous fluids, solutions, sols, or solids suspended in fluids, sometimes referred to in the art as fluidized solids.

Present methods for feeding quick settling slurries such as, for example, lime slurries to water for the purpose of removing the iron values and altering the pH are plagued with problems of plugged lines, stuck valves, erratic feed controls, high maintenance costs, and the like. As a consequence, efforts have been made to overcome these difficulties by using very dilute lime slurries and feeding these either at high feed rates or at low feed rates. However, results have not been satisfactory in either instance. Thus, if the feed rate is high, the volume of diluted slurry being fed becomes excessive, whereas if the feed rate is low, the system becomes plugged due to a build-up of $CaCO_3$ scale in the lines. Efforts to feed thick quick settling slurries have met with other problems. For instance, systems employing multiple pumps have been used for regulating the rate of flow of the slurry, but multiple pumps and the associated valves and piping have only compounded the difficulties that arise in pump maintenance, line plugging, and the like.

An object, therefore, of the present invention is to provide superior method and means for feeding treating agents to a fluid material.

Another object of the invention is to provide a superior method for continuously feeding a quick settling slurry to a fluid so as to alter the properties of the fluid and at the same time preclude plugging and scale formation in the system.

A still further object is to continuously control the flow of a quick settling slurry in accordance with one or more variables in the fluid being treated so that the properties of the treated fluid will be maintained constant for indefinite periods of time.

A still further object of the invention is to provide a lime slurry feed system for treating water with a minimum number of moving parts and with remote control valve means responsive to variations in the water being treated for automatically controlling the flow of slurry to said water.

These and other objects, features and advantages of the invention will be described and illustrated more fully in the following specification and drawing which shows a schematic view of the feed system of this invention incorporating the flow control means for controlling the rate of flow of a treating agent to a fluid.

In general, the invention relates to a continuous method for feeding a treating agent from a supply source to a material to be treated, hereinafter referred to as the influent, and comprises the steps of continuously raising the treating agent to an elevated position above the influent to provide said treating agent with a hydrostatic head for gravity flow to the influent and gravity return to said supply source, and intermittently interrupting the gravity return of said treating agent from said elevated position to said supply source to regulate the flow of said treating agent to said influent. The invention also contemplates a circuit for feeding a treating agent from a supply source to an influent, said circuit comprising a supply pipeline from said supply source to treating agent feed means supported in an elevated position above said supply means and the influent, a pump in the supply pipeline for continuously pumping the treating agent from the supply means to the elevated feed means, a feed pipe from said feed means to the influent, a return pipeline from the feed means to the supply means, and remote control valve means in said return pipeline constructed and arranged to be operated intermittently for interrupting the gravity flow of said treating agent from said feed means to said supply means thereby controlling the rate of flow of the treating agent to the influent.

Referring to the drawing, the fluid circuit of this invention embodies a treating agent source which, for purposes of illustration, is indicated by supply tank 10. A pipeline 11 leads from the supply tank to a tank 12 which is supported in an elevated position above the supply tank 10, the tank 12 being hereinafter referred to as the feed tank. A pump 13 in the pipeline 11 serves to pump the treating agent continuously from the supply tank 10 into the feed tank 12 in which the treating agent is retained for periods of short duration depending upon the required rate of feed of the treating agent to the influent. The latter is retained, during treatment, in a treatment tank 14 into which the treating agent is fed by a feed pipe 15 from the feed tank 12. The effluent, i.e. the treated influent, leaves the treatment tank 14 by discharge pipe 16. The feed tank 12, as shown in the circuit diagram, is in an elevated position above the treatment tank 14 so that the treating agent in the feed tank may feed by gravity into the treatment tank. The return pipeline 17 leads from the bottom of the feed tank 12 back to the supply tank 10. Valve means 18 is connected in the return pipeline 17 adjacent the lower end thereof and is preferably a solenoid operated type valve capable of being actuated by remote control. Moreover, inasmuch as the feed tank 12 does not embody moving parts nor require mechanical controls, maintenance or supervision, it also may be conveniently located at points which would normally be inaccessible to personnel, mechanical controls, supervision, and the like. Another important advantage arising out of the use of the remote controlled valve 18 in conjunction with the circuit hereinabove described is that the operation of the valve 18 may be varied in two respects: (1) to control the flow of treating agent to the treatment tank, i.e., by varying the number of valve closings per minute, and (2) by varying the time the valve remains closed at each closing; and hence is ideally suited to those applications in which it is necessary or desirable to compensate for one or two variables in the material being treated. Thus, for example, in the case of adding a lime slurry to influent water to remove the iron values and produce a lime-water effluent of a constant pH, the volume of the influent water being fed to the system would be one variable and the pH of the effluent would be a second variable. By connecting devices responsive to these two variables, as indicated schematically at 19 and 20, to the valve 18 in a manner to control, on the one hand, the number of valve closings per minute and, on the other hand, the time the valve remains closed, both of these variables may be compensated for and the pH of the effluent water thus kept substantially constant. Thus the device 19 may be a standard flow meter which measures the volume of water being fed into the treatment tank, i.e. the influent water, and closes a switch 21 to energize a solenoid operated air valve 22 which, in turn, closes the valve 18 with each 1000 gallons of water fed to the treatment tank 14; while the device 20 is a standard instrument for measuring the pH of the water being treated. This instrument is connected to a timer 23 which is also connected to the solenoid operated air valve 22 to energize the latter with changes in the pH of the water being treated, to automatically hold the valve 18 closed for a predetermined length of time in accordance with the pH of the water.

The operation of the fluid circuit of this invention is as follows: The treating agent is pumped from the supply tank 10 by the pump 13 through the supply pipeline 11 to the feed tank 12. From thence the treating agent may flow back to the supply tank by the return pipeline 17; or may be diverted into the treatment tank 14 by way of the feed pipe 15 depending upon whether the valve 18 is open or closed, respectively. Thus the delivery of the treating agent to either one or the other delivery points is effected by the valve 18 which, as pointed out above, may be, and is, preferably a solenoid operated or similar type of remote control valve. When the valve 18 is open, the pump simply circulates the treating agent through the system, the volume of treating agent circulated by the pump being such that the level of the treating agent in the feed tank is just below the outlet to the treatment tank 14. Hence, the treating agent is not diverted into the treatment tank. When it is desired to feed the treating agent into the treatment tank 14, the valve 18 is closed for a predetermined length of time as a consequence of which the level of the treating agent in the feed tank 12 rises until the treating agent overflows into the feed pipe 15 and from thence into the treatment tank 14. Upon opening the valve, the level of the treating agent in the feed tank immediately drops and the feed to the treatment tank is cut off. In the embodiment shown, the timing of the valve 18 is controlled by the devices 19 and 20, each of which is responsive to a variable property of the material being treated whereby the number of valve closings per minute and the length of time the valve is closed at each closing are closely regulated so that despite variations in the properties, rate of flow, etc., of the material being treated, one or more properties of the effluent material will be constant. Although the devices 19 and 20 are automatic controls for continuously measuring the material being treated, it will be understood that either one or both may be operated manually at predetermined intervals. It has been discovered also that by closing and opening the valve intermittently and especially at frequent intervals severe surging of the fluid in the pipelines is set up which has the effect not only of preventing solids from settling out of the solids-burdened fluid but also of scouring the walls of the pipes thereby precluding both the formation of scale and scale build-up.

To further illustrate the invention, the following examples are given, each being a typical plant scale run.

*Example 1*

In order to produce a water effluent having a pH of 8.5 influent water was pumped continually into a treatment tank into which a lime slurry was fed intermittently using the fluid circuit feeding system of this invention. The lime slurry was made up of 3.1% by weight of solid calcium hydroxide (60 to less than 325 mesh particle size) in a saturated water solution and was circulated through the fluid circuit illustrated in FIG. 1, at a flow rate of 18 gallons per minute. The influent water was fed into the treatment tank at a variable rate of from 1560 to 1740 gallons per minute. The solenoid operating valve was actuated in response to variations in flow of the influent water and to changes in the pH of the water being treated to maintain the pH of the water effluent substantially constant at 8.5. In a period of 14 hours the operation of the valve was as follows:

| Elapsed Time | | No. of valve Closings/ min. | Time Valve closed at each closing (seconds) | pH of Influent Water | Water Flow (gal./ min.) | pH of Effluent Water |
| --- | --- | --- | --- | --- | --- | --- |
| hrs. | min. | | | | | |
| 0 | ------ | 1.56 | 7.2 | 4.9 | 1,560 | 8.5 |
| 0 | 22 | 1.68 | 7.2 | 4.9 | 1,680 | 8.5 |
| 2 | ------ | 1.68 | 7.2 | 4.9 | 1,680 | 8.5 |
| 4 | ------ | 1.7 | 7.2 | 4.9 | 1,700 | 8.5 |
| 6 | ------ | 1.7 | 7.2 | 4.9 | 1,700 | 8.5 |
| 6 | 50 | 1.74 | 7.5 | 4.9 | 1,740 | 8.5 |
| 8 | ------ | 1.74 | 7.5 | 4.9 | 1,740 | 8.5 |
| 10 | ------ | 1.74 | 7.5 | 4.9 | 1,740 | 8.5 |
| 12 | ------ | 1.74 | 7.5 | 4.9 | 1,740 | 8.5 |
| 14 | ------ | 1.65 | 7.5 | 4.9 | 1,650 | 8.5 |

During this particular run, the pH of the water being treated was substantially constant and consequently very little variation had to be made in the time the valve remained closed at each closing.

*Example 2*

A second run was made using the same lime slurry as that described in Example 1. The influent water was fed into the treatment tank at a variable rate of from 2040 to 2400 gallons per minute, the pH of the water being treated varying from 4.7 to 5.2. The solenoid operated valve was actuated in response to variations in flow of the influent water and to changes in the pH of the water being treated to maintain the pH of the water effluent substantially constant at 8.9. In a period of 6 hours, the operation of the valve was as follows:

| Elapsed Time | | No. of valve Closings/ min. | Time Valve closed at each closing (seconds) | pH of Influent Water | Water Flow (gal./ min.) | pH of Effluent Water |
| --- | --- | --- | --- | --- | --- | --- |
| hrs. | min. | | | | | |
| 0 | ------ | 2.37 | 8.6 | 5.2 | 2,370 | 8.9 |
| 1 | ------ | 2.35 | 8.6 | 5.2 | 2,350 | 8.9 |
| 1 | 13 | 2.04 | 8.6 | 4.7 | 2,040 | 8.9 |
| 2 | ------ | 2.07 | 8.6 | 4.7 | 2,070 | 8.9 |
| 2 | 53 | 2.40 | 8.6 | 5.2 | 2,400 | 8.9 |
| 3 | ------ | 2.40 | 8.6 | 5.2 | 2,400 | 8.9 |
| 3 | 30 | 2.07 | 8.6 | 4.7 | 2,070 | 8.9 |
| 4 | ------ | 2.07 | 8.6 | 4.7 | 2,070 | 8.9 |
| 5 | ------ | 2.07 | 8.6 | 4.7 | 2,070 | 8.9 |
| 6 | ------ | 2.07 | 8.6 | 4.7 | 2,070 | 8.9 |

During this particular run, the pH of the effluent was holding substantially constant and hence the time the valve remained closed at each closing did not have to be varied. On the other hand, the number of valve closings per minute was varied, in proportion to the water flow, at a rate of 1 closing for each 1000 gallons of influent.

From the foregoing description and examples, it will be seen that the method and means of this invention for feeding solids-burdened fluids are extremely simple and economical and circumvent such problems as plugged lines, stuck valves, erratic feed controls, high maintenance costs, etc. Moreover, the invention has the additional advantage of being adaptable to systems wherein the material being treated may embody 1 or 2 variables.

The invention may be carried out in other specific ways than those herein set forth without departing from the spirit and essential characteristics of the invention and the present embodiments are, therefore, to be considered in all respects as illustrative and not restrictive and all changes coming within the meaning and equivalency range of the appended claim are intended to be embraced therein.

We claim:

A system for automatically adding a lime slurry to water to remove the iron values therefrom comprising; gravity feed means, a lime slurry supply source, a supply pipe connecting said supply source to said gravity feed means, means arranged to support said gravity feed means in an elevated position with respect to said supply source and said water, a pump connected in said supply pipe arranged to continuously pump said lime slurry from said supply source to said gravity feed means, a feed pipe from said gravity feed means to said water, said feed pipe being connected to said gravity feed means above the connection of said supply pipe to said gravity feed means, a return pipe connected to said gravity feed means below the connection of said supply pipe to said gravity feed means, valve means in said return pipe constructed and arranged to be operated periodically in response to the pH of said water to interrupt the gravity return of said lime slurry from said gravity feed means to said supply source thereby to raise the level of the lime slurry in said gravity feed means to the level of the feed pipe connection thereto thereby feeding said lime slurry by spurts and solely by gravity feed to said water, and pH testing means responsive to the pH of said water constructed and arranged to periodically actuate said valve means.

References Cited in the file of this patent

UNITED STATES PATENTS

| 2,114,101 | Coghill | Apr. 12, 1938 |
| 2,392,026 | Cram | Jan. 1, 1946 |
| 2,572,351 | Kershaw et al. | Oct. 23, 1951 |
| 2,743,909 | Lawlor | May 1, 1956 |
| 2,772,779 | Norris | Dec. 4, 1956 |

FOREIGN PATENTS

| 551,849 | Italy | Nov. 24, 1956 |

OTHER REFERENCES

"Process for Production and Handling of Lime Slurry for Use in Chemical Applications," Minnick et al., Proceedings of Tenth Industrial Waste Conference, Series No. 89 (1955), Purdue Univ., pp. 405–415. (Copy in Group 170–86.)

"Principles of Industrial Waste Treatment," by Gurham, John Wiley & Sons, Inc., N.Y. (1955), pages 178, 183, 184 and 195. (Copy in Scientific Library and Div. 67.)